US007997412B2

United States Patent
Henry et al.

(10) Patent No.: US 7,997,412 B2
(45) Date of Patent: Aug. 16, 2011

(54) DRY INGREDIENTS CONTAINER

(75) Inventors: Lou Henry, Woodridge, IL (US); Chris Mellen, Woodridge, IL (US); Jennifer Courington, Woodridge, IL (US); Jeff Chiu, Woodridge, IL (US); Sarah Mault, Woodridge, IL (US)

(73) Assignee: Wilton Industries Inc., Woodridge, IL (US)

( * ) Notice: Subject to any disclaimer, the term of this patent is extended or adjusted under 35 U.S.C. 154(b) by 0 days.

(21) Appl. No.: 12/561,552

(22) Filed: Sep. 17, 2009

(65) Prior Publication Data
US 2010/0072100 A1 Mar. 25, 2010

Related U.S. Application Data

(60) Provisional application No. 61/097,898, filed on Sep. 18, 2008.

(51) Int. Cl.
*A45C 11/20* (2006.01)
(52) U.S. Cl. ............ 206/542; 206/459.5; 220/212; 220/735
(58) Field of Classification Search ............ 220/735, 220/212, 23.89, 521, 522; 206/541, 542, 206/546, 549, 459.5
See application file for complete search history.

(56) References Cited

U.S. PATENT DOCUMENTS

| 341,621 A | 5/1886 | Zanetti |
| 1,694,119 A | 12/1928 | Frank |
| 2,738,900 A | 3/1956 | Wenger |
| 2,916,837 A | 12/1959 | Bosland |
| 3,113,692 A | 12/1963 | DiPierro |
| 3,380,307 A * | 4/1968 | De Frank ............ 73/427 |
| 3,383,009 A * | 5/1968 | Weikert ............ 206/506 |
| 4,662,520 A | 5/1987 | Griffin |
| 5,123,460 A * | 6/1992 | Reed ............ 141/95 |
| 5,706,974 A | 1/1998 | Murdick et al. |
| 5,778,769 A | 7/1998 | Dodson |
| 6,000,159 A | 12/1999 | Hornung |
| 6,021,903 A | 2/2000 | Hanson |
| 6,415,947 B1 | 7/2002 | Kim |
| 6,793,096 B1 | 9/2004 | Seok |
| D501,755 S | 2/2005 | Namur |
| D511,655 S | 11/2005 | Kim |
| 7,090,089 B2 | 8/2006 | Lown et al. |
| 7,175,041 B2 * | 2/2007 | Ekkert ............ 220/212 |
| 7,264,120 B2 | 9/2007 | Turvey et al. |

(Continued)

OTHER PUBLICATIONS

List of ingredient containers Aug. 5, 2009.

(Continued)

*Primary Examiner* — Jacob K Ackun, Jr.
(74) *Attorney, Agent, or Firm* — Foley & Lardner LLP

(57) ABSTRACT

A container comprises a storage compartment and a lid. The storage compartment may be formed of plastic, and may include indicia of measuring. The lid may be removably attached to the storage compartment by a latching mechanism. The latching mechanism may be sturdy enough to contain the contents of the storage compartment, even when those contents are substantially heavy. The contents of the storage compartment may pass through an opening in the lid. The opening may be covered by a removably attached closure, and the closure may include indicia of measuring. The closure may thus be removed from the lid, and used as a measuring device. A scoop may be removably attached to the inside of the lid, may include indicia of measuring, and may be used as a measuring device.

12 Claims, 5 Drawing Sheets

U.S. PATENT DOCUMENTS

| | | |
|---|---|---|
| D580,218 S | 11/2008 | Kim |
| 7,530,478 B2 * | 5/2009 | Blomdahl et al. ............ 222/556 |
| 2002/0149994 A1 | 10/2002 | Ancona et al. |
| 2003/0015534 A1 | 1/2003 | Lown et al. |
| 2003/0081498 A1 | 5/2003 | Buchsteiner |
| 2004/0035867 A1 | 2/2004 | Schultz et al. |
| 2004/0084464 A1 | 5/2004 | Koo |
| 2005/0035125 A1 | 2/2005 | Bae |
| 2005/0162971 A1 | 7/2005 | Buchsteiner |
| 2006/0124653 A1 | 6/2006 | McRorie, III |
| 2006/0156811 A1 | 7/2006 | Borowski et al. |
| 2008/0041861 A1 * | 2/2008 | Crawford et al. ............ 220/697 |
| 2008/0105684 A1 | 5/2008 | Lindsay |
| 2008/0110911 A1 | 5/2008 | Chen |
| 2009/0084786 A1 * | 4/2009 | Claypool et al. ............ 220/254.9 |
| 2009/0200309 A1 * | 8/2009 | Kosmyna et al. ........ 220/495.02 |
| 2010/0012659 A1 * | 1/2010 | Holcomb et al. ............. 220/501 |
| 2010/0108670 A1 * | 5/2010 | Perry et al. ................. 220/23.87 |

OTHER PUBLICATIONS

International Search Report, mailed on May 10, 2010 on related PCT Application PCT/US2009/056992.

* cited by examiner

DRY INGREDIENTS CONTAINER

REFERENCE TO RELATED APPLICATIONS

This application claims priority to U.S. Provisional Application No. 61/097,898, filed Sep. 18, 2008, and hereby incorporates by reference all subject matter disclosed therein.

BACKGROUND OF THE INVENTION

1. Field of the Invention

The present invention is directed to storage containers, and more particularly to an improved storage bin, lid, latching mechanism, handle arrangement, date indicator, pour opening, pour closure, and measuring scoop.

2. Prior Art

Durable containers having a storage compartment and a removable lid are known in the art as being useful for storing food stuffs, including dry ingredients such as flour or sugar.

Such dry ingredients are often removed from such containers by use of a scoop, ladle, or spoon. Such known containers, though, present a number of problems, including: that the lid may not be attached securely enough to support the weight of heavier ingredients, such that the container may accidentally open and spill the contents thereof; that the lid may be difficult to close or open, for example by a user having arthritis or smaller hands; that the scoop may be separated from the container, or lost within the storage compartment under the contents thereof; that the contents of the container may expire after a period of time, but the user may have no indication of the length of time the contents have been stored in the container; that the container may slip on or scratch a surface upon which it may be placed; and that the container may be heavy and unwieldy, such that a user may have difficulty grasping the container and pouring the contents therefrom.

SUMMARY OF THE INVENTION

A container comprises a storage compartment; a lid, removably attached to said storage compartment, comprising at least an inside and an outside; an opening in said lid, through which the contents of the storage compartment may pass; a closure over said opening, hingedly attached to the outside of said lid; and a scoop, removably attached to the inside of said lid.

Additional features, advantages, and embodiments of the invention may be set forth or apparent from consideration of the following attached detailed description and drawings. Moreover, it is to be understood that both the foregoing summary of the invention and the following attached detailed description are exemplary and intended to provide further explanation without limiting the scope of the invention as claimed.

BRIEF DESCRIPTION OF THE DRAWINGS

The accompanying drawings, which are included to provide a further understanding of the invention, which are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced.

The construction and function of preferred embodiments of the container and lid arrangement will be better understood by reference to the following description, taken in conjunction with the accompanying drawings, in which like components are designated by the same reference numeral in the several figures.

DETAILED DESCRIPTION OF THE INVENTION

Figure 1:
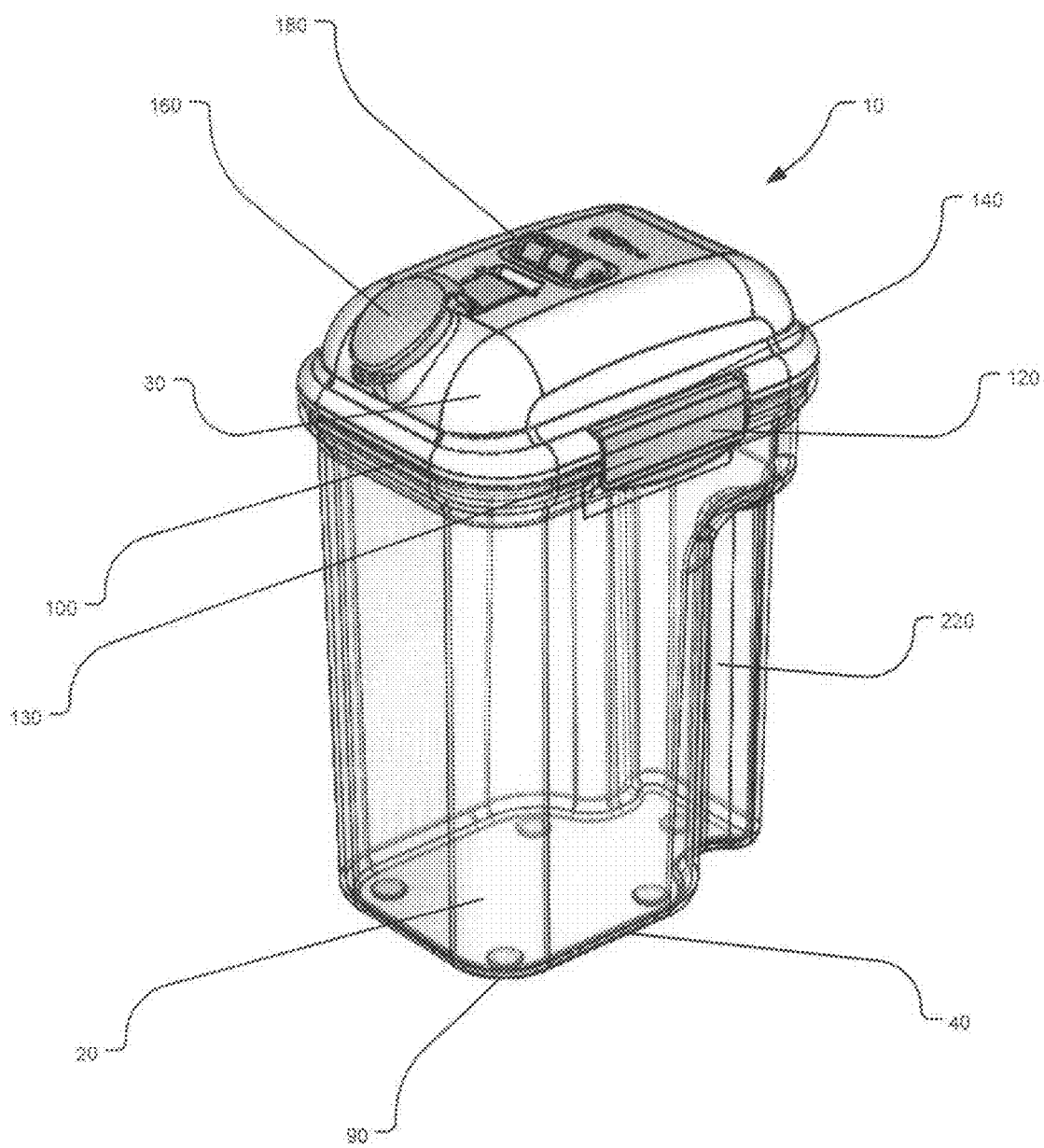
FIG. 1 is a perspective top view of a container and lid in accordance with the present invention showing the lid latched to the container.
Figure 2:
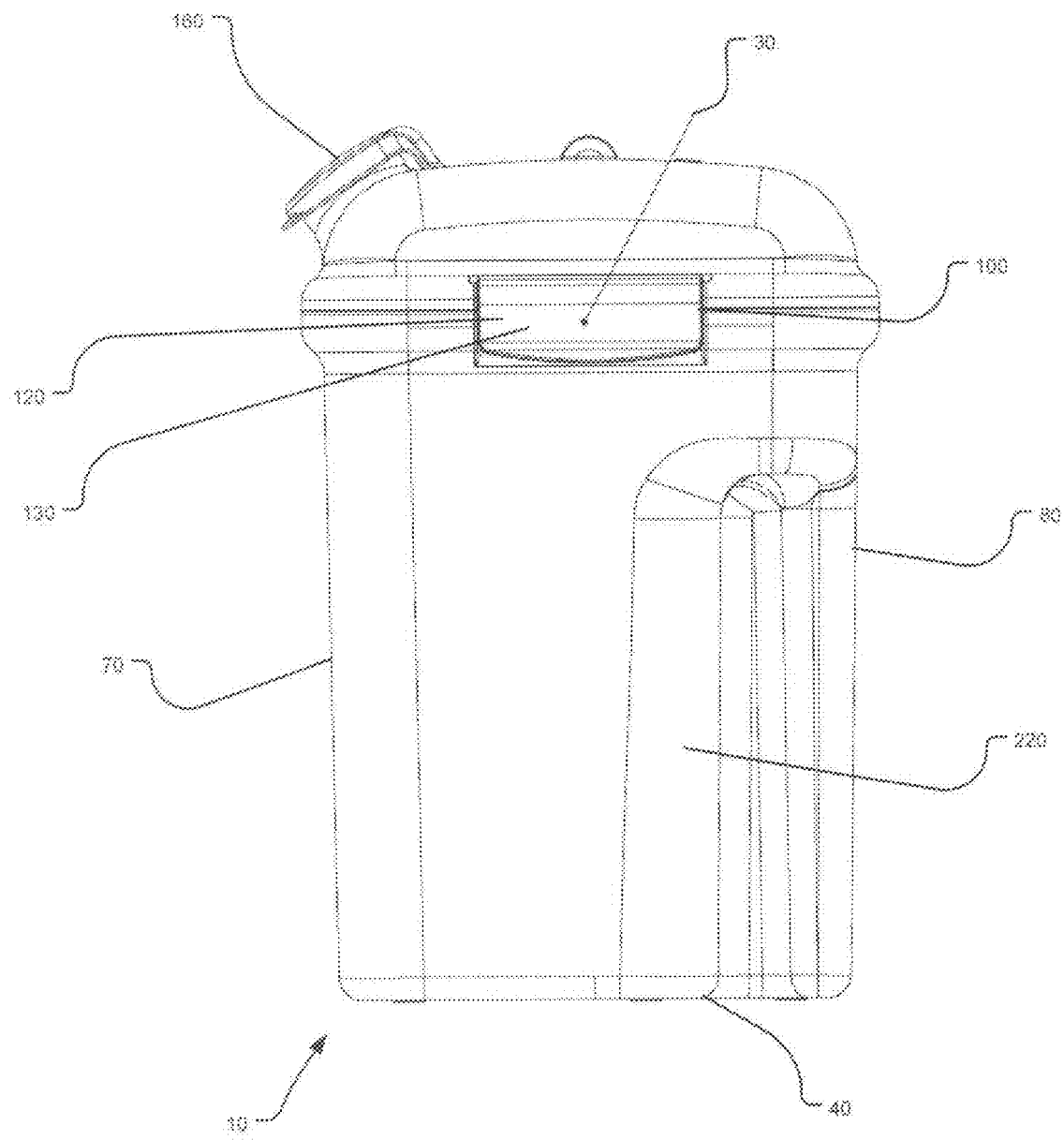
FIG. 2 is a side elevational view of the container and lid.
Figure 3:
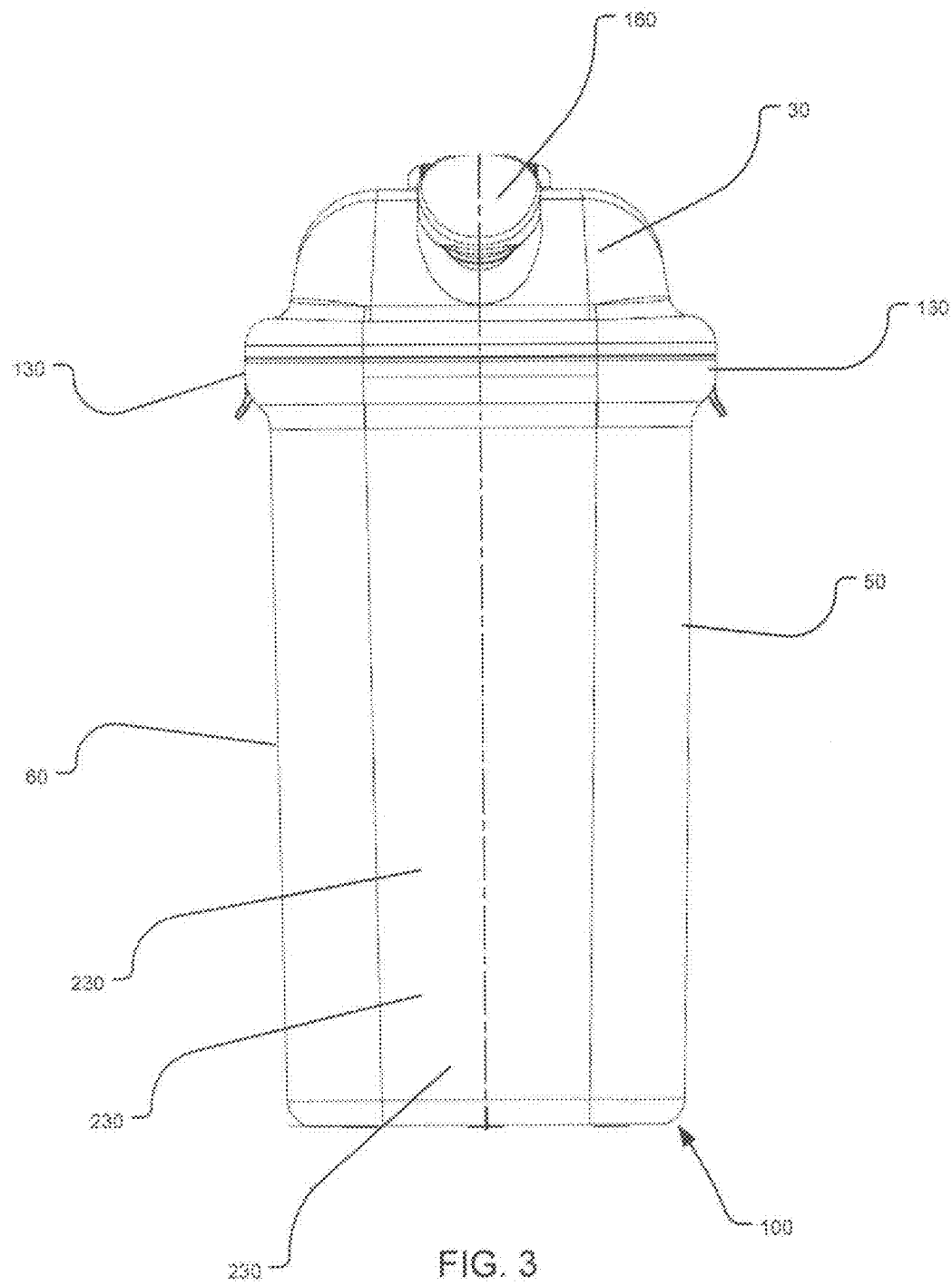
FIG. 3 is a front elevational view of the container and lid.
Figure 4:
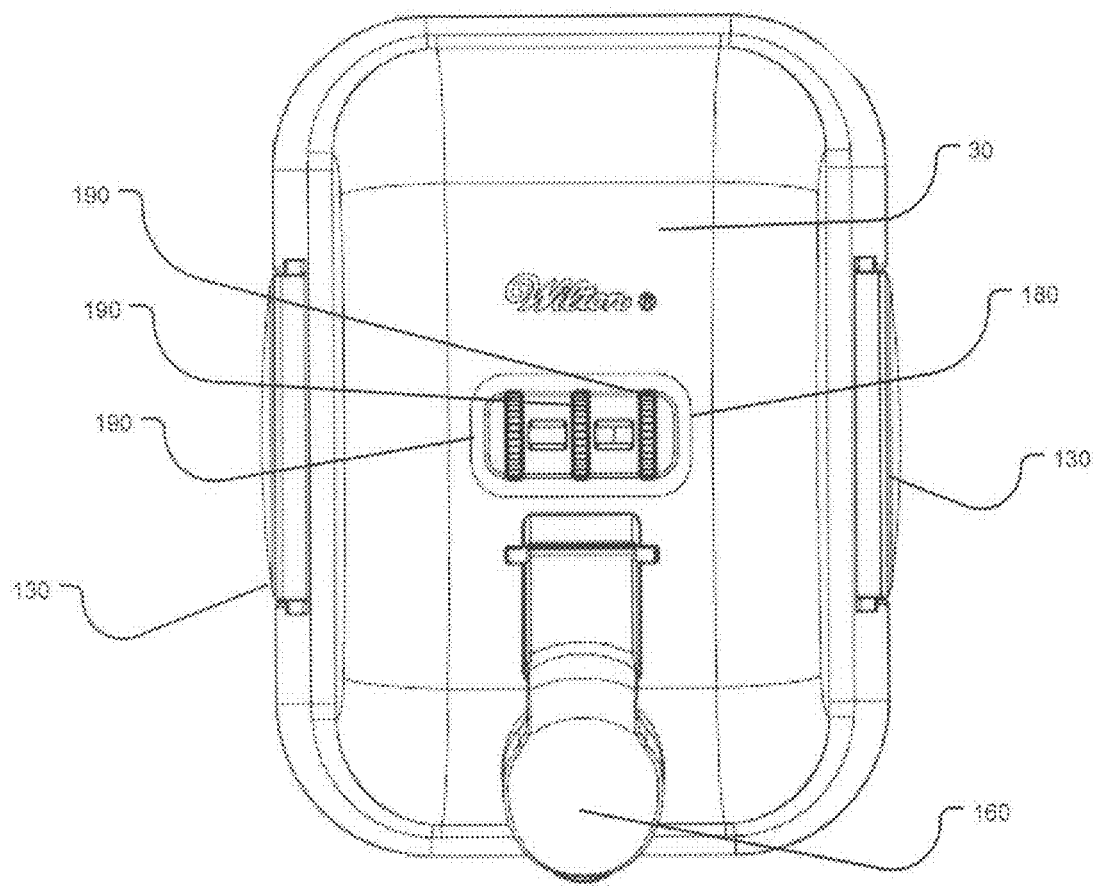
FIG. 4 is a top plan view of the container and lid.

The embodiments of the invention and the various features and advantageous details thereof are explained more fully with reference to the non-limiting embodiments and examples that are described and/or illustrated in the accompanying drawings and detailed in the following attached description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

Referring now to FIGS. 1-5, in preferred embodiments, the container 10 of the present invention includes a storage compartment 20 and a lid 30. The storage compartment 20 may include a bottom 40, a first side panel 50, a second side panel 60, a front panel 70, and a back panel 80. The bottom 40 may merge with the side panels 50 and 60, and with the front and back panels 70 and 80 in order to form a compartment suitable for storing food stuff such as flour or sugar and the like. The intersections of the bottom 40, the side panels 50 and 60, and the front and back panels 70 and 80 may each form a rounded corner 90, as shown in FIG. 1, or may be configured to form any shape, for example a rectangular, circular, or ovoid. The side panels 50 and 60, and the front and back panels 70 and 80, terminate in an upper edge 100, having an outwardly extending lip 110.

The lid 30 may be removably attached to the upper edge 100, through the use of a latching mechanism 120. The latching mechanism 120 may include at least one latch 130 that is hingedly attached to an edge 140 of lid 30, which may extend roughly parallel to the first side panel 50, passing beyond the outwardly extending lip 110, and latching thereto. Preferably, the latching mechanism 120 attaches the lid 30 to the upper edge 100 in a fashion secure enough to bear substantial weight (for example, that of a 5 pound bag of flour or sugar)

without becoming unintentionally unlatched. The latching mechanism 120 is preferably also attached to the upper edge 100 in a fashion such that it can be easily opened when intentionally unlatched (for example, by a user having arthritis). The latching mechanism 120 may, in a preferred embodiment, include two latches 130, which may be disposed on opposing sides of the upper edge 100.

The lid 30 may include an opening 150, through which the contents of the storage compartment 20 may be poured. The opening in the lid 150 may be covered by a closure 160. The closure 160 may be hingedly attached to the lid 30, such that it may be placed in an open or a closed position, and may be hingedly attached, such that it may be separated from the lid 30. The closure 160 may be marked with indicia of measuring, so that for example, the user may remove the closure 160 from the lid, and pour a pre-determined amount of the contents of the storage compartment 20 into the closure 160, using the closure to measure the pre-determined amount.

The lid 30 may include a configurable indicator 180. The configurable indicator 180 may be configured to indicate the date the contents of the storage compartment 20 were placed therein, or may indicate some other notable information, such as the contents of the storage compartment 20, or a date by which the contents should be used. The configurable indicator 180 may include a plurality of wheels 190, each of which may be independently rotated about a wheel post 200, which in turn may be attached to the lid 30. The configurable indicator 180 may further include a wheel cover 210, which may also be attached to the lid 30. The wheel cover 210 may be configured such that certain indicia, such as numbers, that are marked on the wheels 190, may be seen through the wheel cover 210, when the container 10 is in use. In this way, each wheel 190 may be rotated to display a certain indicia, such that upon subsequent use of the container 10, a user may observe the indicia. For example, at the time of filling the container 10, the wheels 190 may be set to indicate the date "Sep. 18,2009," and upon subsequent use of the container, the configurable indicator 180 may indicate that its contents were placed in the container 10 on the 18th day of September, 2009.

Alternatively, the configurable indicator 180 may be a digital indicator. For example, e.g., at the time of filling the container 10, the configurable indicator 180 may be set to indicate the date "Sep. 18,2009" in a digital display, and upon subsequent use of the container, the configurable indicator 180 may indicate that its contents were placed in the container 10 on the 18day of Sep. 2009.

Alternatively, the configurable indicator 180 may be set to indicate the date "Sep. 18,2009" whether in analog or digital format, and upon subsequent use of the container, the configurable indicator 180 may indicate the number of remaining days until an expiration date of the contents. In this embodiment, a counter may automatically count down from the set value (using a drive mechanism (e.g., a servo-motor) for the analog version, or a digital circuit for the digital version), so that when it reaches 0 or a negative number, the configurable indicator 180 may indicate that the contents may be expired and should be discarded.

The storage compartment 20 may include one or more indentations 220, disposed on the back panel 80 of the storage compartment 20, for ease of handling. The indentations 220 may be disposed such that the container 10 can be more easily lifted, carried, and the contents poured therefrom (for example, by a user having arthritis). The indentations 220 may extend only partially up the height of the storage compartment 20, as shown in FIG. 1, or alternately may extend up the entire height of the storage compartment 20.

The storage compartment 20 may include indicia of marking 230, so that, for example, the user may know the amount of the contents of the container 10.

The storage compartment 20 may include three or more feet 240 disposed on the bottom panel 40 of the storage compartment 20. The feet 240 may be relatively small plastic or rubber disks, and may prevent the bottom panel 40 of the storage container 20 from coming in contact with a surface upon which it may be placed. The feet 240 may further be a material that prevents slipping along a surface upon which the storage container 20 may be placed.

Figure 5:
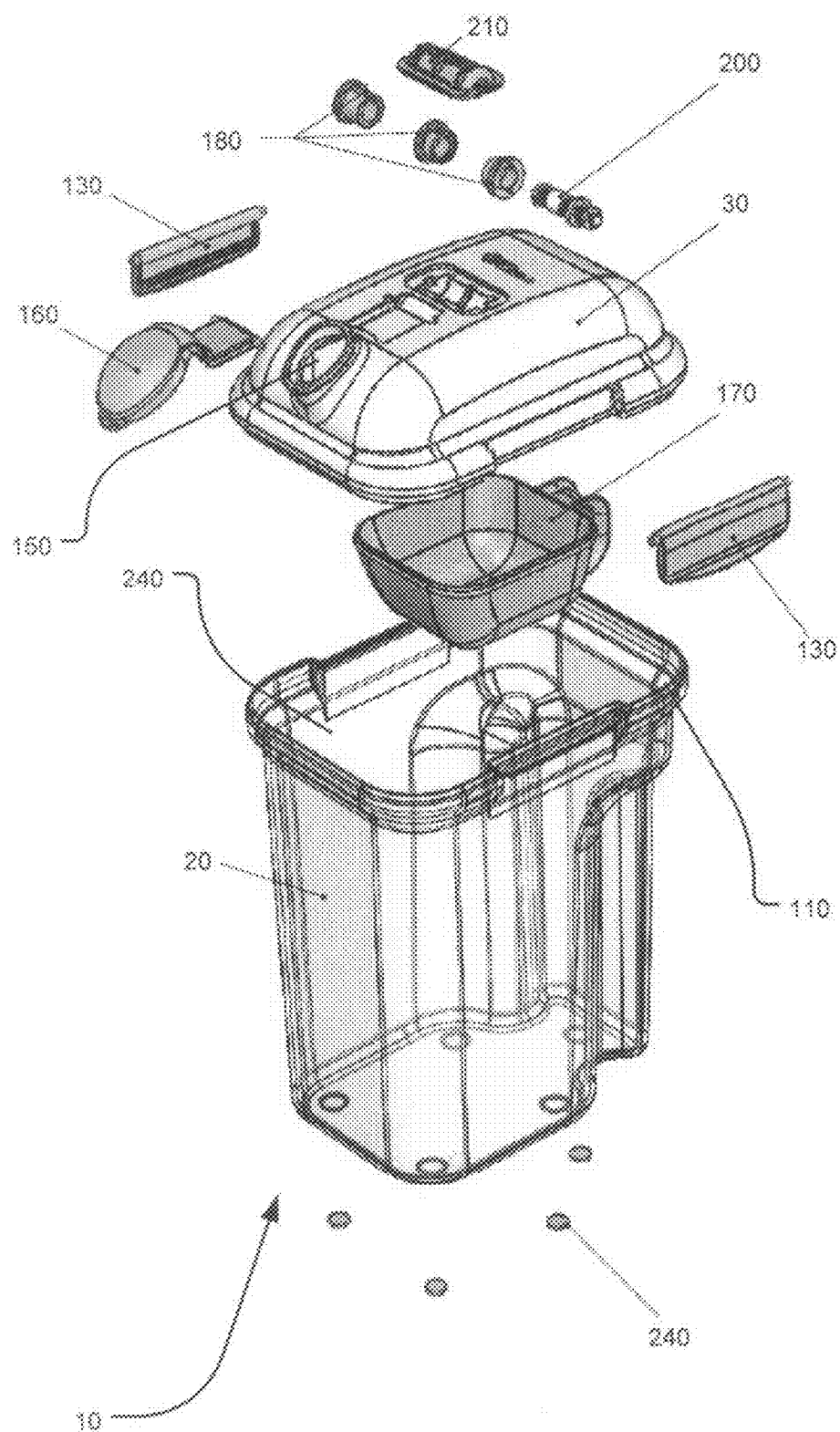
FIG. 5 is an exploded perspective top view of the container and lid showing the lid detached from the container.

Within a cavity 240 created by the storage compartment 20 and the lid 30, a scoop 170 may be stored. The scoop 170 may be removably attached to the underside of the lid 30, such that it is not buried by the contents of the storage compartment 20, and such that it is readily accessible by the user. The scoop 170 may include indicia of measuring, so that for example, the user may remove the scoop 170 from the lid, and pour a pre-determined amount of the contents of the storage compartment 20 into the scoop 170, using the closure to measure the pre-determined amount. In a preferred embodiment, the width of the cavity formed at the upper edge 100 will be large enough to comfortably accommodate a user's hand while maneuvering the scoop 170. As shown in FIG. 5, scoop 170 may have a shape that prevents it from being passed through opening 150.

In a preferred embodiment, the container 10, when assembled such that the lid 30 is attached to the storage compartment 20 by the latching mechanism 120, may be airtight and/or watertight, such that the contents of the storage container 20 do not substantially spill, and such that the contents are unharmed by disturbances such as humidity and pests.

The elements of the present invention may be made from any materials, but a preferred embodiment may be made of a suitable plastic, most preferably having sufficient rigidity to withstand normal use.

The above-described container may be made in a variety of sizes, i.e. lengths, widths, and depths, but a preferred size would approximate a 5-pound bag of sugar, or a 5-pound bag of flour, in order to facilitate everyday use.

The improved, simple and inexpensive container described herein provides a reliable sealing and storage system for food stuff. Various modifications and combinations will occur to persons skilled in the art without involving any departure from the spirit and scope of the invention as defined in the appended claims.

What is claimed:

1. A Container comprising:
   a storage compartment;
   a lid, removably attached to said storage compartment, comprising at least an inside and an outside;
   an opening in said lid, through which the contents of the storage compartment may pass;
   a closure over said opening, hingedly attached to the outside of said lid, said closure comprising indicia of measuring; and
   a scoop, removably attached to the inside of said lid, said scoop comprising indicia of measuring.

2. The container of claim 1, wherein said storage compartment comprises:
   a bottom comprising at least three edges;
   at least three sides, each attached to one of said at least three edges of said bottom;
   wherein at least one of said at least three sides comprises n indentation; and
   wherein the indentation is adapted to form a handle.

3. The container of claim 1, wherein said storage compartment further comprises:
    a bottom; and
    at least three feet attached to said bottom.

4. The container of claim 3 wherein said at least three feet comprises a non-slip material.

5. The container of claim 1 wherein said storage compartment comprises indicia for measuring.

6. The container of claim 1 wherein said lid comprises:
    at least three edges;
    at least two latches, each latch being hingedly attached to one of said at least three edges; and
    each latch being removably attached to said storage compartment.

7. The container of claim 1, further comprising a configurable indicator, attached to said container.

8. The container of claim 7, wherein said configurable indicator comprises:
    a plurality of wheels;
    each of said wheels comprises a generally cylindrical and fixably rotatable member, and
    each of said wheels displays one of: a number, letter, symbol, or blank space.

9. The container of claim 7, wherein said configurable indicator may be configured to indicate a date.

10. The container of claim 1, further comprising a configurable indicator, attached to said lid.

11. The container of claim 1, further comprising a configurable indicator, attached to the outside of said lid.

12. The container of claim 7, wherein said configurable indicator is digital.

* * * * *